United States Patent
Young de la Sota et al.

(10) Patent No.: US 12,541,582 B2
(45) Date of Patent: Feb. 3, 2026

(54) FUNCTION CALL AUTHENTICATION FOR PROGRAM FLOW CONTROL

(71) Applicant: Google LLC, Mountain View, CA (US)

(72) Inventors: Miguel Cristian Young de la Sota, Cambridge, MA (US); Mehmet Alphan Ulusoy, Framingham, MA (US)

(73) Assignee: Google LLC, Mountain View, CA (US)

( * ) Notice: Subject to any disclaimer, the term of this patent is extended or adjusted under 35 U.S.C. 154(b) by 267 days.

(21) Appl. No.: 18/167,744

(22) Filed: Feb. 10, 2023

(65) Prior Publication Data

US 2023/0259603 A1    Aug. 17, 2023

Related U.S. Application Data

(60) Provisional application No. 63/267,965, filed on Feb. 14, 2022.

(51) Int. Cl.
*G06F 21/33* (2013.01)
*G06F 9/30* (2018.01)

(52) U.S. Cl.
CPC .......... *G06F 21/33* (2013.01); *G06F 9/30101* (2013.01)

(58) Field of Classification Search
CPC ....................................................... G06F 21/33
See application file for complete search history.

(56) References Cited

U.S. PATENT DOCUMENTS

| | | | | |
|---|---|---|---|---|
| 5,923,883 | A | * | 7/1999 | Tanaka ............... G06F 8/443 712/220 |
| 7,284,116 | B2 | * | 10/2007 | Jourdan ............. G06F 9/30181 712/216 |
| 8,712,039 | B2 | | 4/2014 | Ebeid et al. |
| 8,769,637 | B2 | | 7/2014 | Janzen |
| 10,911,221 | B2 | | 2/2021 | Hutter et al. |
| 2002/0144236 | A1 | | 10/2002 | Beer et al. |

(Continued)

FOREIGN PATENT DOCUMENTS

| CN | 110471924 | 11/2019 |
|---|---|---|
| CN | 112632476 | 4/2021 |

(Continued)

OTHER PUBLICATIONS

Abadi, et al., "Control-Flow Integrity—Principles, Implementations, and Applications", Nov. 2005, 14 pages.

(Continued)

*Primary Examiner* — William S Powers
(74) *Attorney, Agent, or Firm* — Colby Nipper PLLC

(57) ABSTRACT

This document discloses aspects of function call authorization for program flow control. In some aspects, a processor encounters a first instruction to initiate or call a function. The processor compares an immediate value of a second instruction at an entry point of the function to a function call authorization value stored in a register. In response to the immediate value of the second instruction matching the function call authorization value stored in the register the process transfers control flow to the function. Alternatively, if the values do not match, an exception or fault may be raised to halt execution of the function or other code. By so doing, these and other aspects of function call authorization may prevent fault injection attacks, execution of unauthorized instructions, or access to sensitive data.

20 Claims, 8 Drawing Sheets

(56) References Cited

U.S. PATENT DOCUMENTS

| | | | |
|---|---|---|---|
| 2004/0181684 | A1 | 9/2004 | Hong et al. |
| 2006/0259744 | A1* | 11/2006 | Matthes .............. G06F 15/7867 712/220 |
| 2008/0178010 | A1 | 7/2008 | Vaterlaus et al. |
| 2008/0184016 | A1* | 7/2008 | Erlingsson .......... G06F 9/30054 712/E9.001 |
| 2009/0141887 | A1 | 6/2009 | Yap et al. |
| 2009/0282393 | A1 | 11/2009 | Costa et al. |
| 2010/0146624 | A1 | 6/2010 | Meyer et al. |
| 2013/0159791 | A1 | 6/2013 | Fabrice et al. |
| 2013/0166514 | A1 | 6/2013 | Schultz |
| 2015/0113640 | A1 | 4/2015 | Krten et al. |
| 2015/0186251 | A1 | 7/2015 | Friedler et al. |
| 2017/0024559 | A1* | 1/2017 | Hughes ................. G06F 21/54 |
| 2018/0082057 | A1* | 3/2018 | LeMay ................. G06F 21/54 |
| 2021/0264020 | A1* | 8/2021 | LeMay ................. G06F 21/53 |
| 2022/0374415 | A1* | 11/2022 | Boling .................. G06F 21/52 |
| 2022/0414218 | A1* | 12/2022 | Torvik ................. G06F 21/563 |
| 2024/0422005 | A1 | 12/2024 | Sukhomlinov et al. |
| 2025/0007948 | A1 | 1/2025 | Sota et al. |

FOREIGN PATENT DOCUMENTS

| | | |
|---|---|---|
| JP | 2001282106 A | 10/2001 |
| JP | 2018088147 A | 6/2018 |
| JP | 2022541057 A | 9/2022 |
| WO | 2020076555 A1 | 4/2020 |
| WO | 2023063924 | 4/2023 |
| WO | 2023091803 | 5/2023 |

OTHER PUBLICATIONS

Amar, "An Armful of CHERIs", Retrieved at: https://msrc-blog.microsoft.com/2022/01/20/an_armful_of_cheris/, Jan. 20, 2022, 10 pages.
"International Preliminary Report on Patentability", Application No. PCT/US2021/054431, Apr. 16, 2024, 8 pages.
"International Preliminary Report on Patentability", Application No. PCT/US2022/071360, May 2, 2024, 8 pages.
"International Search Report and Written Opinion", Application No. PCT/US2021/054431, Jul. 1, 2022, 11 pages.
"International Search Report and Written Opinion", Application No. PCT/US2022/071360, Jul. 27, 2022, 11 pages.
Almahdi, Ismail, "HMAC-SHA384-VHDL/ HMACSHA384_ISMAIL.vhd", Retrieved at: https://github.com/ismailalmahdi/HMAC-SHA384-VHDL/blob/master/HMACSHA384ISMAIL.vhd—on Jun. 21, 2022, 10 pages.
Arias, Dan, "Hashing in Action: Understanding bcrypt", Feb. 25, 2021, 19 pages.
Arnautov, et al., "ControlFreak: Signature Chaining to Counter Control Flow Attacks", Sep. 28, 2015, 10 pages.
Aumasson, et al., "SPHINCS—Submission to the NIST post-quantum project, v.3 Contents", Oct. 1, 2020, 62 pages.
Berthet, et al., "An Area-Efficient SPHINCS Post-Quantum Signature Coprocessor", Jun. 17, 2021, pp. 180-187.
Bjoern, Kerler, "opencl_Brute/pbkdf2.cl", Retrieved from https://github.com/KenChen-Xeniro/opencl_brute/blob/master/ Library/worker/generic/pbkdf2.cl—on Jun. 21, 2022, 5 pages.
De Clercq, et al., "A survey of Hardware-based Control Flow Integrity (CFI)", Jul. 31, 2017, 27 pages.
De Clercq, et al., "SOFIA: Software and Control Flow Integrity Architecture", Apr. 28, 2016, 6 pages.
Lalande, et al., "Software Countermeasures for Control Flow Integrity of Smart Card C Codes", Jan. 1, 2014, pp. 200-217.
Werner, et al., "Protecting the Control Flow of Embedded Processors Against Fault Attacks", Mar. 10, 2016, pp. 161-176.
"Foreign Office Action", JP Application No. 2024-529608, May 7, 2025, 4 pages.
"Foreign Office Action", JP Application No. 2024-520759, May 7, 2025, 7 pages.
"Foreign Office Action", IN Application No. 202447039928, Jul. 25, 2025, 7 pages.
"Foreign Office Action", JP Application No. 2024529608, Oct. 7, 2025, 4 pages.
"Foreign Office Action", KR Application No. 10-2024-7017716, Nov. 24, 2025, 10 pages.
"Non-Final Office Action", U.S. Appl. No. 18/711,527, filed Nov. 21, 2025, 9 pages.

* cited by examiner

FUNCTION CALL AUTHENTICATION FOR PROGRAM FLOW CONTROL

CROSS-REFERENCE TO RELATED APPLICATION

This application claims priority to U.S. Provisional Patent Application Ser. No. 63/267,965, filed on Feb. 14, 2022, the disclosure of which is incorporated by reference herein in its entirety.

BACKGROUND

As a result of the ever-increasing computerization of society, and the growing reliance upon personal computing devices to store sensitive user information and perform a variety of operations for its users, including operating vehicles and completing digital currency transactions, the world is increasingly susceptible to a variety of costly attacks on sensitive information.

Recent fault-based cryptanalysis methods have identified potentially security-threatening methods involving fault injection attacks. A fault injection attack involves an attacker physically injecting, as opposed to a software injection, a fault into a computing system, thereby intentionally altering the behavior of an electronic component. As a result, fault injection attacks can circumvent many low-level system security features, alter a computing system behavior to accomplish malicious intents, and/or extract sensitive information. A physical fault injection attack may involve voltage glitching, clock glitching, laser injection, electromagnetic injection, and so forth. In some instances, these attacks can introduce fault injections in various locations to break or weaken electronic system security.

SUMMARY

This document describes apparatuses and techniques for function call authorization for program flow control. In some aspects, a processor encounters a first instruction, such as a branch instruction or a jump instruction, to initiate or call a function. The processor compares an immediate value of a second instruction at an entry point of the function to a function call authorization value stored in a register. In response to the immediate value of the second instruction matching the function call authorization value stored in the register the process transfers control flow to the function. Alternatively, if the values do not match, an exception or fault may be raised to halt execution of the function or other code. In other aspects, a compiler or macro may harden functions by generating and associating function call authorization values with respective functions and inserting, into the functions, code to perform function call authorization when initiating or during execution of the functions. By so doing, these and other aspects of function call authorization may prevent fault injection attacks, execution of unauthorized instructions, or access to sensitive data.

This Summary is provided to introduce simplified concepts for implementing function call authorization for flow control, which is further described below in the Detailed Description and is illustrated in the Drawings. This Summary is not intended to identify essential features of the claimed subject matter, nor is it intended for use in determining the scope of the claimed subject matter.

BRIEF DESCRIPTION OF THE DRAWINGS

The details of one or more aspects of function call authorization for flow control are described throughout the disclosure with reference to the Drawings. The use of the same reference numbers in different instances in the description and the figures indicate same or similar elements.

DETAILED DESCRIPTION

Figure 1:
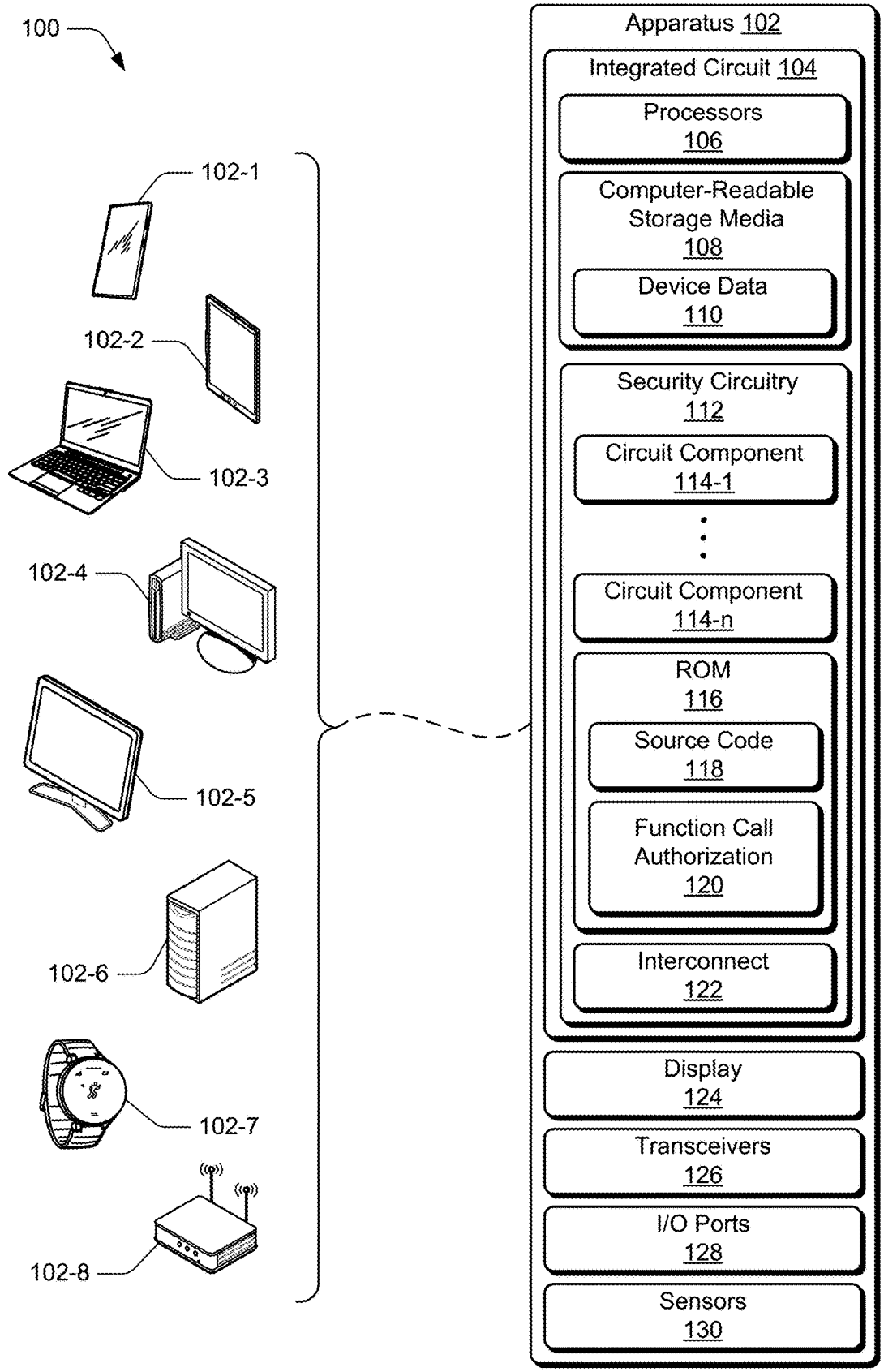
FIG. 1 illustrates an example operating environment that includes apparatuses that may implement aspects of function call authorization for flow control.

Computing systems often include an integrated circuit with security circuitry and software to provide a measure of protection against defects, attacks, and other potentially compromising events. In today's computing environment, bad actors can attack computing devices at a myriad of levels using a multitude of attack vectors. For example, fault injection attacks reduce the protection many of these security paradigms afford. Fault injection attacks can bypass system security features, alter a system behavior to accomplish malicious intents, and/or uncover confidential information. Using a fault injection attack, an attacker can indirectly or directly alter programmed operations of an electronic component (e.g., a central processing unit) using glitches (e.g., sudden, temporary, injected faults in a system). Such an attack can sometimes "brick" a computing device, but in other instances, precise and targeted attacks can introduce compromising security threats. For example, fault injection attacks can allow adversaries to undermine the control flow of a program, which may result in an incorrect function getting called, such as in "return to libc" type attacks. In some cases, these attacks may cause the computing device to expose sensitive data or execute unverified code. Generally, jumping into high-value functions can completely compromise the enforcement of signature validation and other checks in secure firmware, permitting attacker takeover of a device.

In contrast with preceding security techniques, this disclosure describes aspects of function call authorization for flow control. In aspects, a function call authorization token or value may prevent unauthorized jumps into a function or unauthorized execution of code unless a function authorization check is successful on entry into the function or during execution of code of the function. In other words, to ensure that functions cannot be called by simply jumping into them, concepts of function call authorization are introduced to protect forward-edge control flow. In various implementations, multiple functions are provided or associated with an additional parameter, which may be referred to as an "authorization token." The authorization token may be a last parameter of a function to vary which register the authorization token is placed. Thus, multiple functions or every function of a program or block of code may have a small random constant (e.g., high entropy value) associated with it. In some cases, the small random constant is configured or sized to fit in an instruction (e.g., branch or jump) immediate, such as 12 bits for a reduced instruction set computer V (RISC-V) architecture. In various aspects, when one of the functions is called, a processor or other flow control entity compares a value of an authorization token of the function to an authorization token value that should be set in a register before the function is called. The authorization token value of the register must match the authorization token value of the function to continue executing code of the function. An authorization check at the beginning of the function will immediately abort the program if the value of the authorization token register is incorrect.

Additionally, this authorization check may be repeated at other parts of the function, such as per a programmer's or compiler's discretion. This check may include a single instruction, due to the size of the constant, and will prevent jumping directly into a function without first setting up the authorization token value in the register. Because access to such a register may be restricted, it would be quite difficult for an attacker to set the authorization token register with the correct value in addition to forcing a jump into the function. As such, aspects of function call authentication can be effective in preventing flow control attacks that rely on unauthorized jumps into functions. In some cases, function call authentication may be implemented as a hardening measure in ROM firmware, which may protect forward-edges of control flow.

Aspects of function call authorization may also be efficient to implement with a small amount of code added to a program. For example, as described herein, function hardening may be implemented using a script, a macro, or a compiler that adds code to apply aspects of function call authorization for flow control. Alternatively or additionally, programmers may implement aspects of function call authorization by hand, such as by selecting specific functions to harden or configuring various code applied to a function to implement function call authorization. As such, aspects of function call authorization may be automated and customizable to protect functions and code of a wide variety of applications.

To safeguard computing systems from the compromising events described above, this document describes apparatuses and techniques for function call authorization to provide secure and validated flow control in computing systems. The following discussion describes an operating environment, example implementations of function call authorization, example methods, and a System-on-Chip (SoC) in which components of the operating environment may be embodied. In the context of the present disclosure, reference is made to the operating environment by way of example only.

Example Environment

FIG. 1 illustrates an example environment 100 that includes an apparatus 102 in which aspects of function call authorization can be implemented. The apparatus 102 may be implemented as any suitable device, some of which are illustrated as a smart-phone 102-1, a tablet computer 102-2, a laptop computer 102-3, a gaming console 102-4, a desktop computer 102-5, a server computer 102-6, a wearable computing device 102-7 (e.g., smart-watch), and a broadband router 102-8 (e.g., mobile hotspot). Although not shown, the apparatus 102 may also be implemented as any of a mobile station (e.g., fixed- or mobile-STA), a mobile communication device, a client device, a user equipment, a mobile phone, an entertainment device, a mobile gaming console, a personal media device, a media playback device, a health monitoring device, a drone, a camera, an Internet home appliance capable of wireless Internet access and browsing, an IoT device, and/or other types of electronic devices. The apparatus 102 may provide other functions or include components or interfaces omitted from FIG. 1 for the sake of clarity or visual brevity.

The apparatus 102 includes an integrated circuit 104 that utilizes one or more processors 106 and computer-readable media (CRM 108), which may include memory media or storage media. The processors 106 may be implemented as a general-purpose processor (e.g., of a multicore central-processing unit (CPU) or application processor (AP)), an application-specific integrated circuit (ASIC), graphics processing unit (GPU), or a system on chip (SoC) with other components of the apparatus 102 integrated therein. The CRM 108 can include any suitable type of memory media or storage media, such as read-only memory (ROM), programmable ROM (PROM), random access memory (RAM), dynamic RAM (DRAM), static RAM (SRAM), or Flash memory. In the context of this discussion, the computer-readable media 108 of the apparatus 102 is implemented as at least one hardware-based or physical storage device, which does not include transitory signals or carrier waves. Applications, firmware, and/or an operating system (not shown) of the apparatus 102 can be embodied on the computer-readable media 108 as processor-executable instructions, which may be executed by the processor 106 to provide various functionalities described herein. The computer-readable media 108 may also store device data 110, such as user data or user media that is accessible through the applications, firmware, or operating system of the apparatus 102.

In this example, the integrated circuit 104 contains security circuitry 112. The apparatus 102, the integrated circuit 104, or the security circuitry 112 may implement a secure cryptographic processor. The security circuitry 112 may be implemented using one or more circuit components 114, for example, circuit component 114-1 through circuit component 114-n. The circuit components 114 may be organized to perform any number of operations to enable functionality of the apparatus 102. Examples of circuit components include a processor and multiple functional components as described in FIG. 2. The security circuitry 112 can be realized as, for example, a protected enclave, a trusted chip platform, a hardware-based root of trust (RoT) chip (e.g., a silicon RoT), and so forth. Regardless of how or where the security circuitry 112 is incorporated into an electronic device, the security circuitry 112 may counter or deter many different types of attacks.

In aspects, the security circuitry 112 also includes a read-only memory 116 (ROM 116) that stores source code 118 and a function call authorization module 120 (function call authorization 120), which may include one or more of code, instructions, data, values, registers, and so forth for implementing aspects of function call authorization. Generally, a function call works at the machine level through a label that may be set in generated assembly code, which is then transformed into an offset at link time by a complier. The processor 106 or other logic unit then loads the value of that label and address into a register and then the processor jumps to that address. In aspects, part of a function call may be burned as an immediate, such as for RISC V where only the lower 12 bits are burned with the high 12 bits set into a register. In some cases, the register used for the jump instruction is x31 but may be any suitable register in the register file. As described herein, the function call authorization block 120 may include code or instructions added to functions and programs, instructions for performing function call authorization checks, instructions for accessing registers configured to support function call authorization, or the like. These are but a few examples of entities useful to enable function call authorization, the implementations and uses of which vary and are described throughout the disclosure.

As shown, the security circuitry 112 is coupled to an interconnect 122. The interconnect 122 can be realized using, for example, a bus, a switching fabric, or a bus network that enables the various circuit components to communicate. Each of the circuit elements may be directly or indirectly coupled to the interconnect 122. The interconnect 122 may enable communication with data ports or interfaces of the apparatus 102 to enable circuit components to communicate with other devices or data networks.

The apparatus 102 may also include a display 124, transceivers 126, input/output ports (I/O ports 128) and/or sensors 130. The display 124 may be operably coupled with one of the processors 106 (e.g., graphics processing unit (GPU)) and configured to graphically present an operating system or applications of the apparatus 102. The transceivers 126 may be configured to enable wired or wireless communication of data (e.g., device data 110) over wired or wireless networks according to any suitable communication protocol. The I/O ports 128 of the apparatus 102 may include universal serial bus (USB) ports, coaxial cable ports, and other serial or parallel connectors (including internal connectors) useful to couple the electronic device to various components, peripherals, or accessories such as keyboards, microphones, or cameras.

The apparatus 102 also includes sensors 130, which enable the apparatus 102 to sense various properties, variances, stimuli, or characteristics of an environment in which the apparatus 102 operates. For example, the sensors 130 may include various motion sensors, ambient light sensors, acoustic sensors, capacitive sensors, infrared sensors, temperature sensors, radar sensors, or magnetic sensors. In aspects, the sensors 130 may be used to generate entropy for reseeding the PRNG 120. Alternatively or additionally, the sensors 130 may enable interaction with, or receive input from, a user of apparatus 102, such as through touch sensing or proximity sensing.

Example Circuit Components

Figure 2:
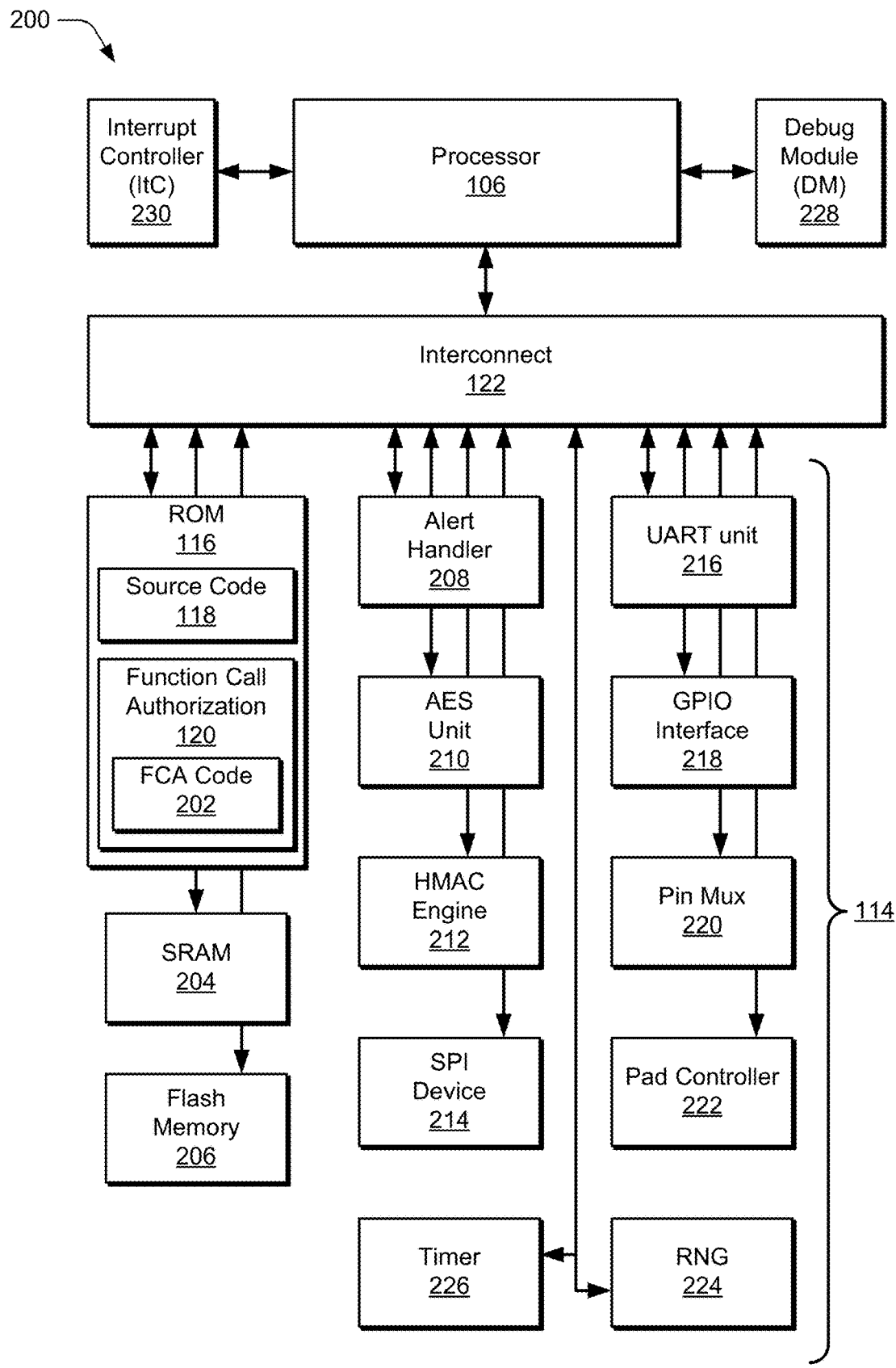
FIG. 2 illustrates example security circuitry that includes multiple circuit components that can implement aspects of function call authorization.

FIG. 2 illustrates at 200 example security circuitry 112 that includes multiple circuit components which can be implemented to support aspects of function call authorization. As shown, the security circuitry 112 includes a processor 106 that is coupled to an interconnect 122. Each of the processor 106, the multiple memories, and the multiple other circuit components 114 may be directly or indirectly coupled to the interconnect 122. In aspects, the components of FIG. 2 may be embodied as a secure computing platform or a secure System-on-Chip that implements a root-of-trust and/or other secure cryptographic features.

In example implementations, the multiple memories can include a read-only memory 116 (ROM 116), which may be implemented similar to or different from the ROM 116 of FIG. 1. In this example, the ROM 116 includes source code 118 and a function call authorization block 120, which includes function call authorization code 202 (FCA code 202). The source code 118 may be hardcoded or masked code of the ROM 116, and may include boot code, firmware, or other low-level code of an apparatus 102 or electronic device. In aspects, the FCA code 202 may include function call authorization code within functions or programs, instructions for accessing function call authorization registers, a function call authorization library, a function authorization fault or interrupt handler, function authorization token values for functions, and so forth.

As shown in FIG. 2, the memories also include static random-access memory (SRAM 204) and a flash memory 206. In aspects, the ROM 116, SRAM 204, or the flash memory 206 may be implemented within the security circuitry 112 or within the CRM (e.g., CRM 108). The multiple components 114 can include an alert handler 208, an advanced encryption standard (AES) unit (AES unit 210), a hash-based message authentication code (HMAC) engine (HMAC engine 212), and a serial peripheral interface (SPI) device (SPI device 214). The multiple components 114 can also include a universal asynchronous receiver/transmitter (UART) unit (UART unit 216), a general-purpose input/output (GPIO) interface (GPIO interface 218), a pin multiplexer (pin mux 220), and a pad controller 222. The multiple components 114 can further include a random number generator (RNG 224), from which the function call authorization block 120 may obtain high entropy values to use as authentication tokens, and a timer 226. Additionally, the components 114 can include any of the ROM, SRAM, and/or Flash memories, as shown in FIG. 2. Although certain examples of memories and other components 114 are depicted in FIG. 2 or described herein, a given implementation of the security circuitry 112 may include more, fewer, and/or different instances of processors, controllers, memories, modules, or peripheral devices, including duplicates thereof.

The illustrated circuit components can be operated synchronously based on one or more clock signals. Although not shown in FIG. 2, the security circuitry 112 may include at least one clock generator to generate the clock signals or may include reset circuitry to reset one or more individual components independently of each other, multiple components jointly, or an entire IC chip. Alternatively, the security circuitry 112 may receive at least one clock signal or a reset signal from a source that is external to the security circuitry 112, which source may or may not be on a separate chip. One or more separate components 114 may operate in respective individual clock domains. For instance, circuit components may be synchronized to a clock that is local to a respective component. Components in different clock domains may operate or communicate asynchronously with respect to one another.

Example implementations of the illustrated components are described below. The processor 106 may be realized as a "main," "central," or "core" processor for the security circuitry 112. The processor 106 may, by way of example only, be implemented with a 32 bit, in-order reduced instruction set computing (RISC) core with a multi-stage pipeline. With, e.g., a RISC-V functionality, the processor may implement an M (machine) and a U (user) mode. Activating a reset pin (not shown) (e.g., through de-assertion of an active-low reset pin) causes the processor 106 to exit reset and begin executing code at its reset vector. The reset vector may be in the ROM 116, which validates code in the embedded flash (e flash) before jumping to it. In other words, the code is expected to have been instantiated into the e flash before the reset is released. In some cases, resets throughout the security circuitry 112 can be made asynchronous active-low as per a comportability specification to support interoperability among the various circuit components. A reset may be generated by the alert handler 208 as a security countermeasure; by a watchdog timer; and so forth. Reset signals may also be sent to other circuit components, such as one of the memories or one of the other components 114.

Coupled to the processor 106 are a debug module 228 (DM) and an interrupt controller 230 (ItC), either of which may also be made comportable. The debug module 228 provides debug-access to the processor 106. By interfacing with certain pins of the IC, logic in the debug module 228 allows the processor 106 to enter a debug mode and provides an ability to inject code into the device (e.g., by emulating an instruction) or into a memory. The interrupt controller 230 may be disposed proximate to the processor 106. The interrupt controller 230 can accept a vector of interrupt sources from within the security circuitry 112. The interrupt controller 230 can also assign leveling and priority to the interrupts before forwarding them to the processor 106 for handling.

The processor 106 can provide any desired level of performance or include any internal circuit components. For example, the processor 106 can include at least one arithmetic logic unit (ALU) (e.g., including an "additional" ALU to calculate branch targets to remove a cycle of latency on taken conditional branches), a register file, a control unit, and input/output (I/O) units, and multiple pipeline stages. With multiple pipeline stages, a pipeline can perform register writeback to reduce a cycle of latency from loads and stores and prevent a pipeline stall where a response to a load or store is available the cycle after the request. The processor 106 can implement a single-cycle multiplier or produce an imprecise exception on an error response to a store, which allows the processor to continue executing past the store without waiting for the response. Although not depicted, the processor 106 specifically, or the security circuitry 112 generally, can include an instruction cache to provide single-cycle access times for instructions.

The ALU may be configured to perform arithmetic and logical operations on received data. The register file, which is described further in reference to FIG. 3, may be an array of processor registers (e.g., control registers), serving as high-speed, semi-transient memory configured for quick data access during program or function processing. The register file may be tightly coupled to the ALU of the processor 106. To further facilitate access to the data, the register file may include multiple read ports or multiple write ports to enable the ALU and/or execution unit to contemporaneously retrieve multiple operands in a single cycle. The register file may be formed from flip-flops to accelerate reading and writing bits of the data. The control unit may be configured to control the flow of data throughout the system(s). The I/O units may include ports operably interfaced with other components of the device or security circuitry 112.

In implementations, the ROM 116, may be implemented as hardened ROM that is operably coupled to the processor 106. In such a configuration, the processor 106 can execute read-only instructions stored on the hardened ROM 118. The instructions stored on the ROM 116 include executable code, source code 118, FCA code 202, and so forth. The executable code, in an implementation, was produced by an off-device compiler which converted source code (e.g., a high-level language program) into the executable code (e.g., machine language), which may include code configured to implement aspects of function call authorization for flow control as described herein.

In aspects, the source code 118 may include variables, arrays, objects, subroutines, loops, functions, and other abstract concepts. A function (e.g., a procedure, a method, a sub-routine), for instance, is a set of instructions that performs a task and outputs a return. In aspects, a function may have an entry point or landing pad instruction configured to implement an authorization check of the function based on an immediate value of the instruction and a function call authentication token stored in a register. A return ("return value"), as described herein, refers to any data type value, such as a string, Boolean, integer, and so forth, that a function outputs during or after a task (e.g., computations, string manipulations). In implementations, the return value may be an error code, including numeric (e.g., hexadecimal) or alphanumeric code. As described herein, a scope refers to a block of code that ends in a return, including a function, subroutine, program, and so forth.

In some aspects, at initiation or during function execution, an immediate value of a landing pad instruction of the function may be compared against a function call authorization value stored in a register. When a calling function or program properly configures the function call authorization value stored in the register, control flow may be transferred to the function in response to the immediate value matching the function call authorization value. If the function call authorization value stored in the register is not properly set or configured, a processor may raise a fault in response to the immediate value not matching the function call authorization value. Other aspects of function call authorization are described with reference to FIGS. 3 and 4.

Figure 3:
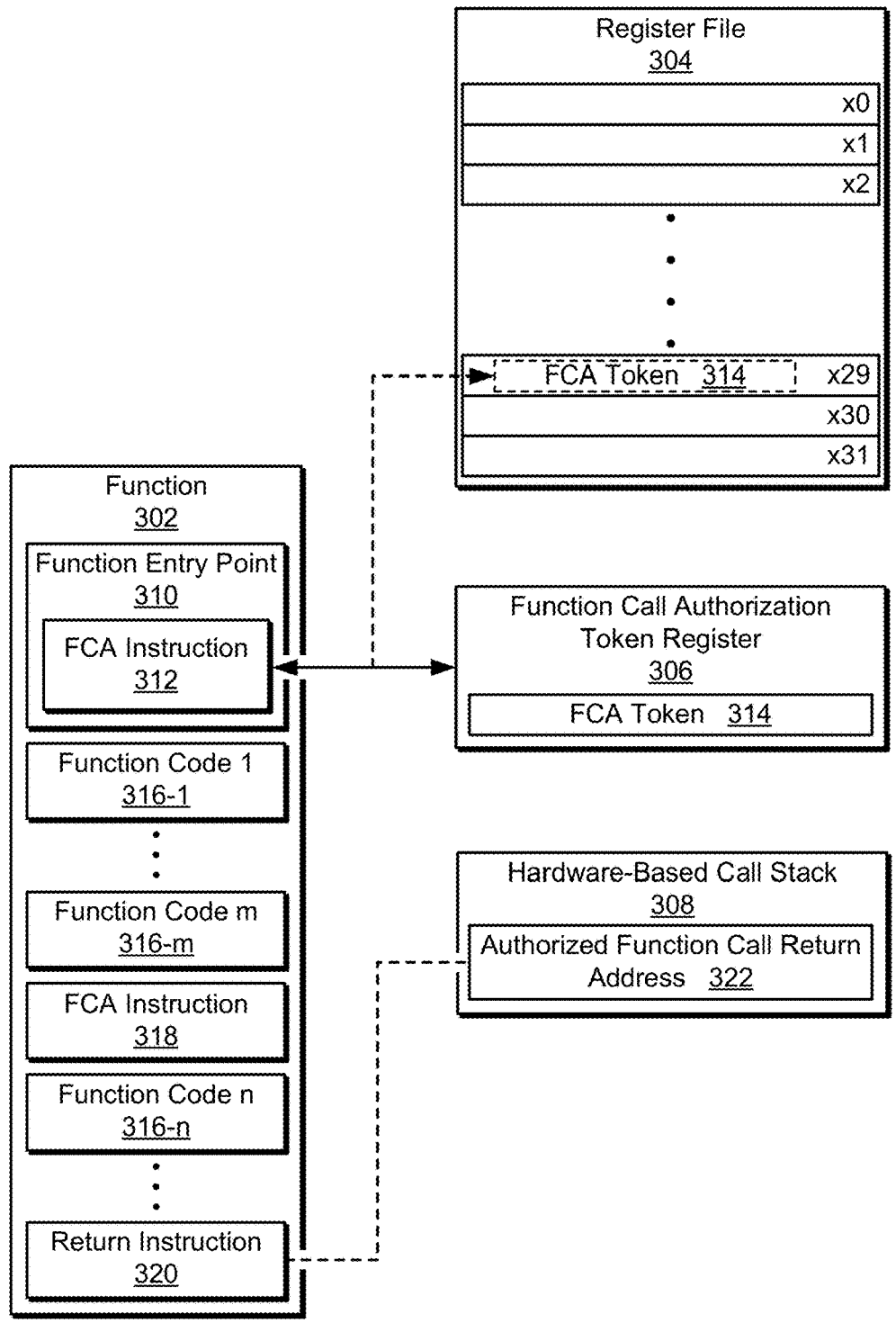
FIG. 3 illustrates an example function and registers configured to implement aspects of function call authorization in accordance with one or more aspects.

FIG. 3 illustrates at 300 an example function and various registers of a system configured to implement aspects of function call authorization in accordance with one or more aspects. In this example, a function 302 has been hardened using function call authorization for flow control, which may access a register file 304 or dedicated function call authorization token register 306. Alternatively or additionally, the system may include a hardware-based call stack 308 to store addresses or other information.

In aspects, the function 302 may include an entry point 310 at which function call authorization instruction 312 (FCA instruction 312) may be inserted or placed. Generally, the FCA instruction 312 may include a landing pad instruction that includes a unique function call authorization value (not shown) assigned to or associated with the function 302. A compiler, script, or macro may obtain and assign unique respective authorization values to a subset of functions or all functions of a program or firmware image, such that each function needs a different authorization token for execution. The function call authorization value associated with the function may include any suitable size of randomized or high entropy value, which may range from 8 bits to 20 bits. In some cases, the function call authorization value is 12 bits and may be included in the instruction as an immediate value. The FCA instruction 312 may compare the function call authorization value assigned to the function to a function call authorization token 314 set or stored in a register of the register file 304 or the function call authorization token register 306. Thus, in order for a function call to be authorized, a calling routine or program must set the correct function call authorization token in a register, which is checked against the respective unique authorization value of assigned to the function.

As shown in FIG. 3, the function includes multiple code lines or code sections, which are represented as function code 1 316-1, function code m 316-*m*, and function code n 316-*n*, where m and n may represent any suitable integers. In aspects, a function may include one or more FCA instructions 318 to implement function call authorization while in the function. At each instance of an FCA instruction, the FAC instruction may compare the authorization value assigned to the function (e.g., as an immediate value of the instruction) to the function authorization token of the dedicated function call authorization token register or another register configured to support function call authorization. In aspects, the function 302 may include a return instruction 320 that is configured to obtain a return address, shown as an authorized function call return address 322, for the authorized function from the hardware-based call stack 308. Using the call stack for a static or pre-configured address may prevent or disable dynamic linking from the function and ensure that flow control is returned to directly a calling function or program, thereby preventing a possible unauthorized return to different functions or code.

In some aspects, function call authorization for flow control may be implemented through an instruction set architecture (ISA) extension. A function call authorization-enabled ISA extension may specify and use specific registers and instructions to implement aspects of function call authorization. Generally, function call authorization-enabled ISA extension may include an additional register that is exclusively accessed for function call authorization by a subset of instructions for setting, reading, and/or erasing authorization token values of that register. In some cases, a specialized function call authorization register is added to the ISA register specification or one of the existing registers may be burned for function call authorization use. In some aspects, function call authorization may be integrated in hardware with constant instructions that are configured to access one or more registers reserved for function call authorization use.

The instructions for implementing function call authorization may include an instruction for setting up the function call authorization token in a specified register before a function call. Another instruction may be configured to perform an authorization check on the function before transferring flow control (e.g., a landing pad instruction), with another instruction configured to perform an authorization check while in the function. In some cases, a compiler can add such instructions to a prelude of one or more functions to implement function hardening.

Some benefits of implementing these aspects include knowing and having a dedicated register for function call authorization and the compiler would not emit other code that touches the register with random arithmetic, which could happen with the source code-based solutions. Alternatively or additionally, components of the ISA extension could be hardened separately, greatly increasing the difficulty of an attacker getting a wrong token into this register. As described herein, by associating a unique or different authorization value or token with each function, an attacker is prevented from, even if obtained, attempting to re-use tokens for another function. Additionally, in some aspects, authorization values may be associated with an address of functions to provide an integrated solution in which the processor itself could check the that the authorization token is set correctly at the time of a jump instruction itself rather than when landing in the function.

Generally, flow control is implemented through a jump instruction or a branch instruction. Accordingly, certain or specific locations in the code of a function may be annotated with the authorization value that it must have in the token register when landing there, if it is allowed as a jump destination into the function. For example, an FCA instruction may be implemented as a special instruction that is a pseudo instruction, such as a NO OP normally, but which contains a contains an immediate value (e.g., unique authorization value of the function) that matches the token value that must be set in the function call authorization register before landing there in the function. Thus, in some implementations, an FCA instruction may be placed at the beginning of every function, and these instructions may serve as a landing pad for entering the function and this allows the processor to do the function call authorization check at each jump instruction or branch instruction (e.g., immediate instructions). The landing pad instruction may be the only entry point of the function and the processor may raise a fault if an attempt is made to enter the function at any other point.

As such, even if an attacker can forge a jump instruction in the instruction stream, the attacker would still need to set up the correct authorization token value in the register to make the jump authorized. When the processor detects or determines a discrepancy between the authorization value of the instruction and the authorization token register, it can raise a fault and prevent further execution of the instruction. Alternatively or additionally, the processor can raise a hardware exception and jump to a handler or raise illegal instruction error in response to the authorization value of the function not matching the authorization token set in the register. Although the described aspects break function pointers on the system, the resulting flow control provided through function call authorization allows improved hardening of the firmware and mask ROM. In some cases, use of the landing pad FCA instructions obviate the need to re-check function authorization while in the function because it is impossible to actually land anywhere in the function except for its entry point because landing on any other instruction would result in a fault.

Figure 4:
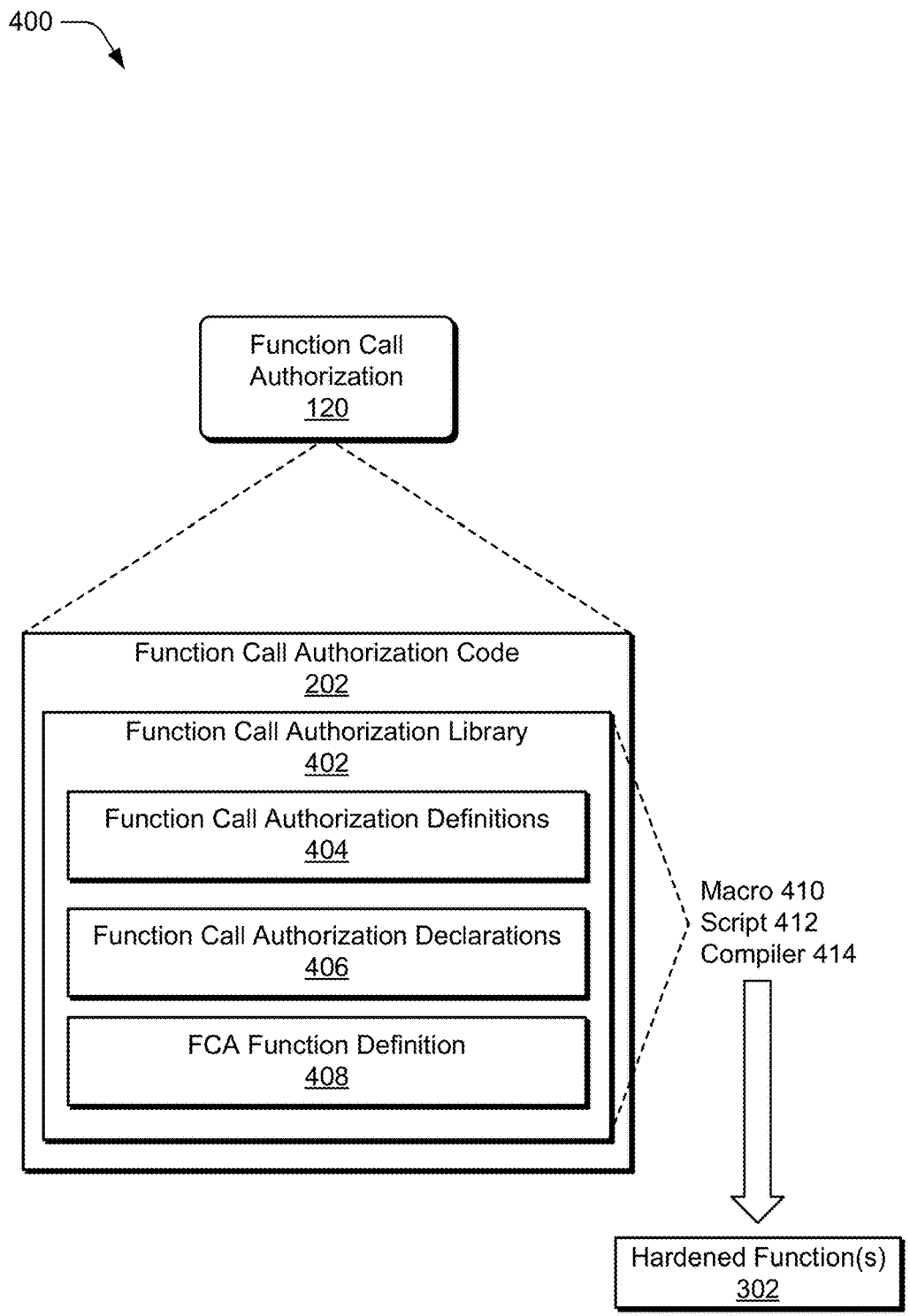
FIG. 4 illustrates an example of a function call authorization library through which aspects of function call authorization may be implemented.

FIG. 4 illustrates at 400 an example of a function call authorization library 402 through which aspects of function call authorization may be implemented. In this example, the function call authentication library 402 is embodied as part of the function call authentication code 202, which may be implemented in association with a compiler or source code stored on a device. In aspects, the function call authentication library 402 may be used to harden functions by adding code to implement function call authentication in accordance with one or more aspects described herein.

As shown in FIG. 4, the function call authentication library 402 may include function call authentication definitions 404, function call authentication declarations 406, and a function call authentication function definition 408 (FCA function definition 408). In aspects, an algorithm to implement function call authorization, such as a macro 410, script 412, or compiler 414 routine, may be implemented with a function call authentication library 402 configured as shown below in the Example Function Call Authentication Library:

```
// cfi.h
typedef uint32_t cfi_authz_t;
#define CFI_DEFINE_AUTHZ_TOKEN(func, value) \
```

```
enum { CFI_AUTHZ_TOKEN(func) = value; }
#define CFI_AUTHZ_TOKEN(func) kCfiAuthz_##func
#define CFI_AUTHZ_PARAM( ) cfi_authz_t cfi_authz_token__
#define CFI_AUTHZ_CHECK(func) \
SHUTDOWN_CHECK(cfi_authz_token__ == CFI_AUTHZ_TOKEN(func))
// function declaration
CFI_DEFINE_AUTHZ_TOKEN(0x06e7); // Random 12-bit integer constant.
void Foo(int x, int y, CFI_AUTHZ_PARAM( ));
// function definition
void Foo(int x, int y, CFI_AUTHZ_PARAM( )) {
CFI_AUTHZ_CHECK(Foo);
// do stuff...
}
// function use
Foo(5, 42, AUTHZ_TOKEN(Foo));
```

Example Function Call Authentication Library

In this example, the library may be implemented as a macro that defines a token for specific function, enumerates the token and parameters, along with defining the authorization check function. In other words, the library can be configured to automatically generate and assign unique authorization token values to each function of a program or sensitive functions that should be hardened. In some aspects, a compiler frontend may be configured to automatically apply the described function call authentication to a subset or all functions of a program or firmware image to provide hardened ROM code. With the functions hardened through function call authorization, a function can be called as shown with the Foo example function by providing function parameters int x, int y, along with the authorization token check function to authenticate execution of the function. As shown, the simple code of the library can be used to implement an application programming interface (API) that is simple to deploy and use, which is of value to programmers attempting to harden multiple functions.

Example Methods

Methods 500 through 700 are illustrated as respective sets of blocks that specify acts or operations that may be performed but are not necessarily limited to the order or combinations shown for performing the operations by the respective blocks. Further, any of one or more of the operations may be repeated, combined, reorganized, or linked to provide a wide array of additional and/or alternate methods. The techniques are not limited to performance by one entity or multiple entities operating on one device. In aspects, operations or acts of the methods 500 through 700 are performed by or managed by a processor, macro, script, compiler, or other entity configured to implement function call authorization for flow control. For clarity, the methods are described with reference to the elements of FIG. 1 and/or entities, components, or configurations described with reference to FIGS. 1-4.

Figure 5:
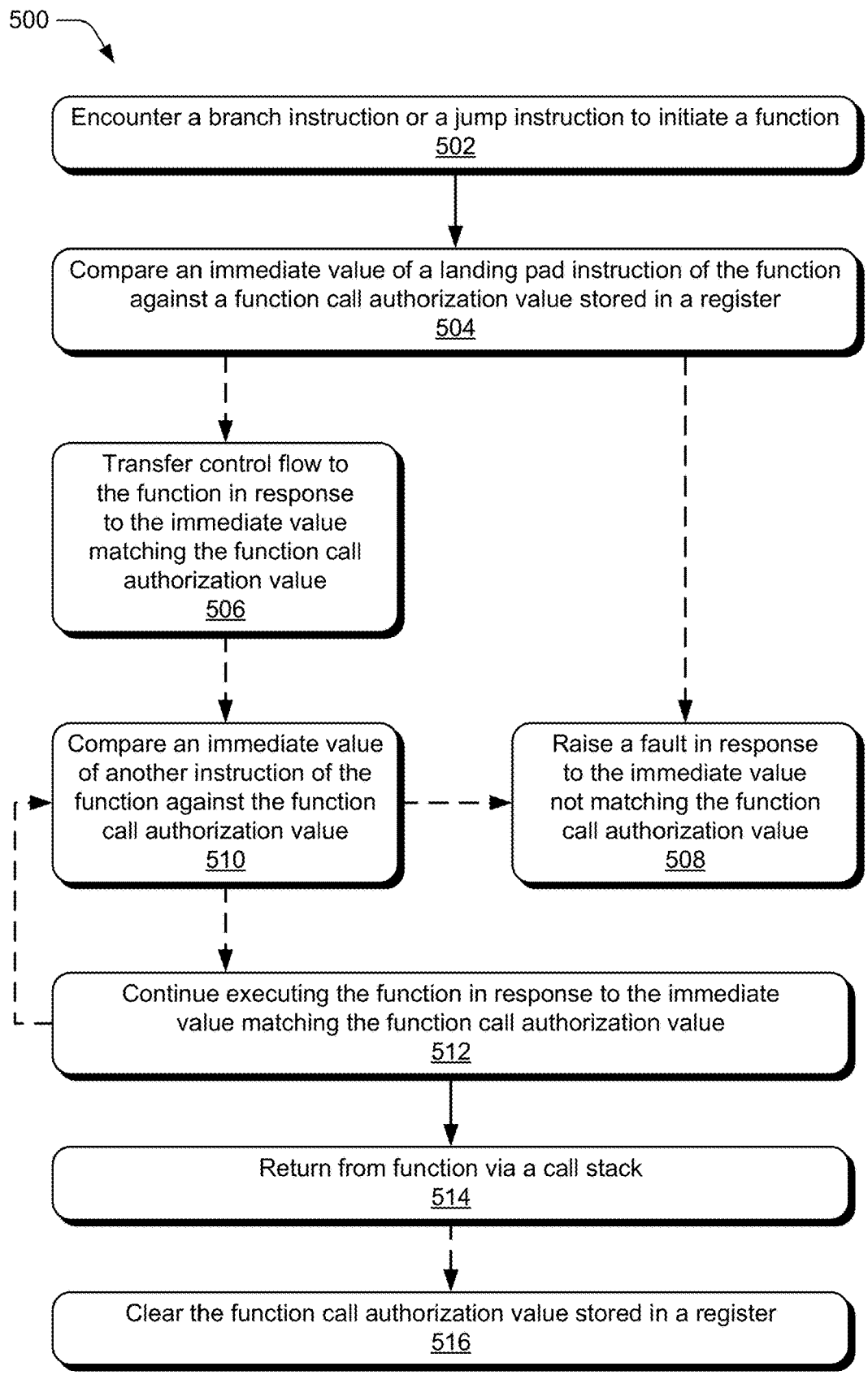
FIG. 5 illustrates an example method for function call authorization implemented with a landing pad instruction in accordance with one or more aspects.

FIG. 5 illustrates an example method 500 for function call authorization implemented with a landing pad instruction in accordance with one or more aspects.

At 502, a processor encounters or reaches a branch instruction or a jump instruction to initiate a function (e.g., call a function of a program). In some cases, the function called accesses or operates on sensitive information, and has been hardened through function call authorization to prevent fault injection attacks from exposes sensitive information or enabling jumps to other code in a ROM, source code, or firmware. For example, the function may include a ROM function for altering a life cycle state (LCS) of an IC or SoC between various prototype, provisioning, configuration, production, and debug stages. In other cases, the function may access or expose cryptographic keys, digital signatures, or other secret information.

At 504, the processor compares an immediate value of a landing pad instruction of the function against a function call authorization value (e.g., authorization token) stored in a register. In some cases, the register is a function call authorization token register that is accessible by a limited number of function call authorization instructions. For example, a compiler may restrict or not emit other code or instructions that are able to access the function call authorization register. From operation 504, the method 500 may proceed to operation 506 to continue function execution or proceed to operation 508 to raise a fault to cease execution of the function.

At 506, the processor transfers flow control to the function in response to the immediate value of the instruction matching the function call authorization value stored in the register. In other words, the processor verifies or checks that a calling program or function has authorized the call of the function being branched or jumped into by setting a correct authorization value or token in the register.

At 508, the processor or another entity raises a fault in response to the immediate value of the landing pad instruction not matching the function call authorization value or token stored in the register. Alternatively, the processor may raise a fault in response to jumping into the function at another instruction or code that is not the landing pad instruction of the function. Thus, aspects of function call authorization may prevent execution of a function unless an entry point of the function is the landing pad instruction that is configured with the authentication value or token for the function.

Optionally at 510, an immediate value of another instruction of the function is compared against the function call authorization value or token. In some aspects, authorization of the function may be checked or verified on entry into the function and at one or more points during execution of function code or instructions. From operation 510, the method 500 may proceed to operation 512 to continue function execution or proceed to operation 508 to raise a fault to cease execution of the function as described above.

At 512, execution of the function continues in response to the immediate value of the other instruction matching the function call authorization value stored in the register. Optionally from 512, the method 500 may return to operation 510 to perform another authorization check while in the function. Thus, function call authorization may be implemented on entry into the function and one or more times while the function executes.

At 514, the function returns flow control to an address obtained from a call stack. In some cases, the call stack is a specific call stack configured to store a return address configured to return to an address following the call into the function. In other words, the return of the function is controlled such that the return from the function is not dynamic and returns to an address pulled off the call stack. By so doing, an attacker is not able to affect the return or exit of the function.

Optionally at 516, the function call authorization value or token is cleared from the register. For example, when the function has preformed its authorized scope of work and access, the function call authorization value or token is cleared to prevent subsequent access to the value or token associated with the function.

Figure 6:
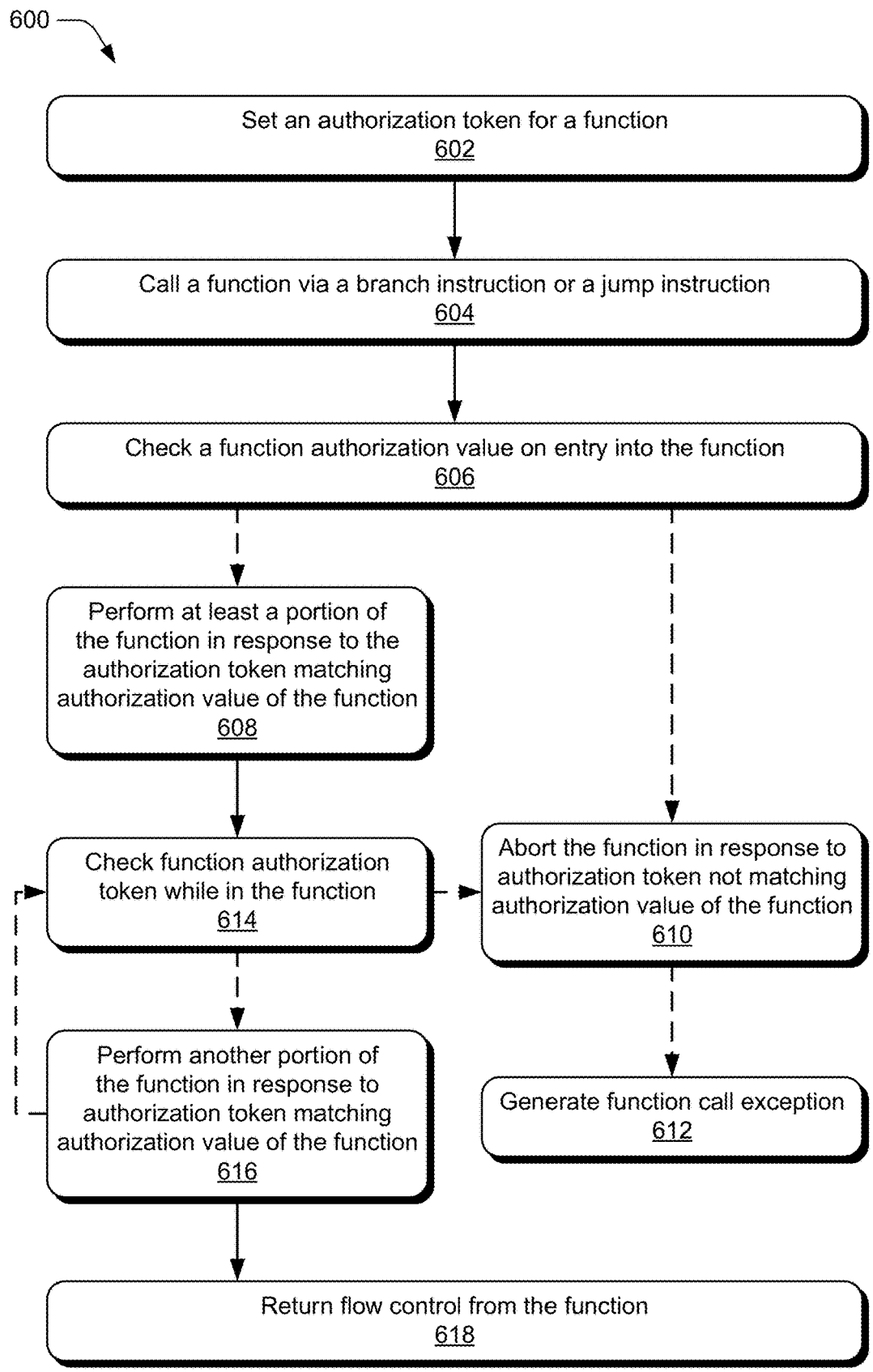
FIG. 6 illustrates an example method for authorizing execution of a function based on an authorization token in accordance with one or more aspects.

FIG. 6 illustrates an example method 600 for authorizing execution of a function based on an authorization token in accordance with one or more aspects.

At 602, an authorization token for a function is set. The authorization token may be set in a general purpose register, a register of the register file, or a dedicated function call authorization token register. In some cases, a function call authorization instruction is executed prior to a jump instruction or a branch instruction to set the authorization token in the register.

At 604, the function is called via a branch instruction or a jump instruction. The call instruction or jump instruction may be configured to enter the function at a landing pad instruction or pseudo instruction configured to authorize execution of the function before allowing code of the function to execute.

At 606, a function authorization value of an instruction of the function is checked against the authorization token on entry into the function. In some cases, an immediate value of an entry or landing pad instruction of the function is compared with or checked against the authorization token stored in the register. From operation 606, the method 600 may proceed to operation 608 to perform a portion of the function or proceed to operation 610 to abort execution of the function.

At 608, at least a portion of the function is performed in response to the authorization token matching the authorization value of the function. In some cases, the authorization value of the function is stored as an immediate value of an instruction used to check the authorization value of the function against the authorization token stored in the register.

At 610, the function is aborted in response to the authorization token not matching the authorization value of the function. Optionally at 612, the method 600 may generate a function call exception to the processor or an exception handler to indicate failure of the function call authentication process.

At 614, the function authentication token is checked while in the function. Thus, depending on implementation, the function authentication token may be checked multiple times on entry into the function and within the function to ensure execution of the function is properly authorized. From operation 614, the method 600 may proceed to operation 616 to perform another portion of the function or proceed to operation 610 to abort execution of the function as described above.

At 616, another portion of the function is performed in response to the authorization token matching the authorization value of the function. Optionally from 616, the method 600 may return to operation 614 to perform another authorization check on the token while in the function. Thus, function call authorization may be implemented on entry into the function and one or more times while the function executes.

At 618, flow control is returned from the function back to the calling program or next function. In some cases, exiting instructions of the function obtain a return address from a call stack to which the function returns. Alternatively or additionally, a return sequence may include an instruction to clear the token from the function call authentication register.

Figure 7:
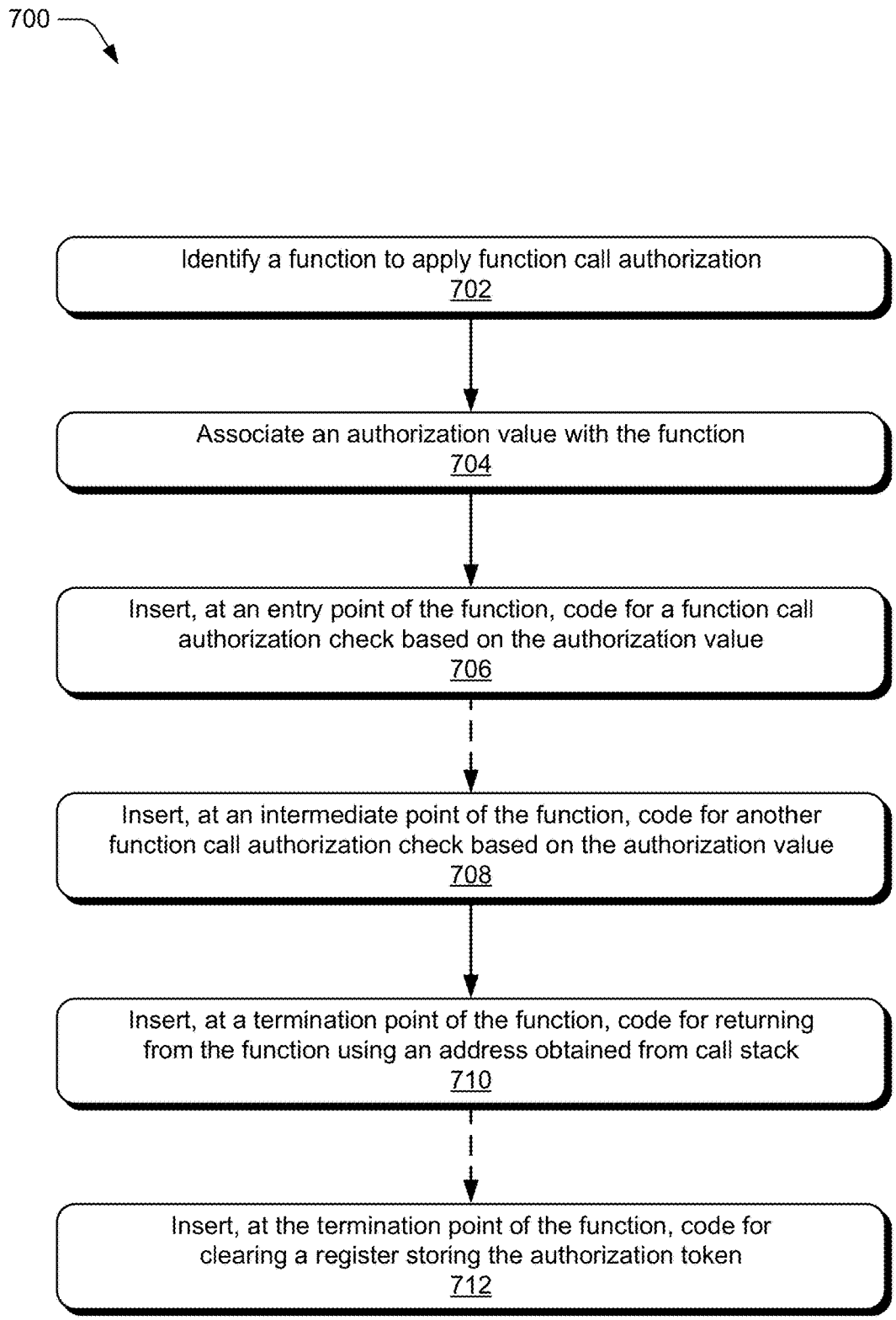
FIG. 7 illustrates an example method for inserting authentication checks in code of functions to harden a program in accordance with one or more aspects.

FIG. 7 illustrates an example method 700 for inserting authentication checks in code of functions to harden a program in accordance with one or more aspects. In various aspects, a script, a macro, a compiler, or the like may implement the operations of method 700 to harden functions of a program or firmware image.

At 702, a function is identified for application of function call authorization. In some cases, a subset of functions of a program are selected to apply function call authorization. In other cases, all functions of a program or firmware image are identified or selected for application of function call authorization. For example, a compiler frontend may identify and select functions of a program that access sensitive information or protected memory areas for hardening by application of function call authorization.

At 704, respective authorization values (e.g., unique to each function) are associated with the functions selected for function call authorization (or hardening). In some cases, the unique authorization values are random values obtained from a random number generator. Generally, the unique authorization values are high entropy values that range in size from 8 bits to 20 bits. In some implementations, the unique authorization values are 12 bits and/or suitable for use as immediate values of instructions in a RISC architecture.

At 706, code for a function call authorization check is inserted at an entry point of the function. The code for the function call authorization check may include an instruction configured to check the authorization value of the function against a function call authorization token stored in a register. In some cases, the instruction is a landing pad instruction for the function through which access to the function is managed using the function call authorization token.

At 708, code for another function call authorization check is inserted an intermediate point of the function. The code for the other function call authorization check may include another instruction configured to check the authorization value of the function against the function call authorization token stored in the register. Thus, code or instructions for multiple function call authorization checks may be inserted at multiple places within the function to harden the function against unauthorized use or access.

At 710, code for returning from the function using an address from a call stack is inserted at a termination point of the function. In other words, the inserted code may include an instruction to return to a static address held in the call stack and prevent or disable dynamic addressing on the function's return. Optionally at 712, code for clearing a register storing an authorization token to which the authorization value is compared is inserted at the termination point of the function.

Example System-on-Chip

Figure 8:
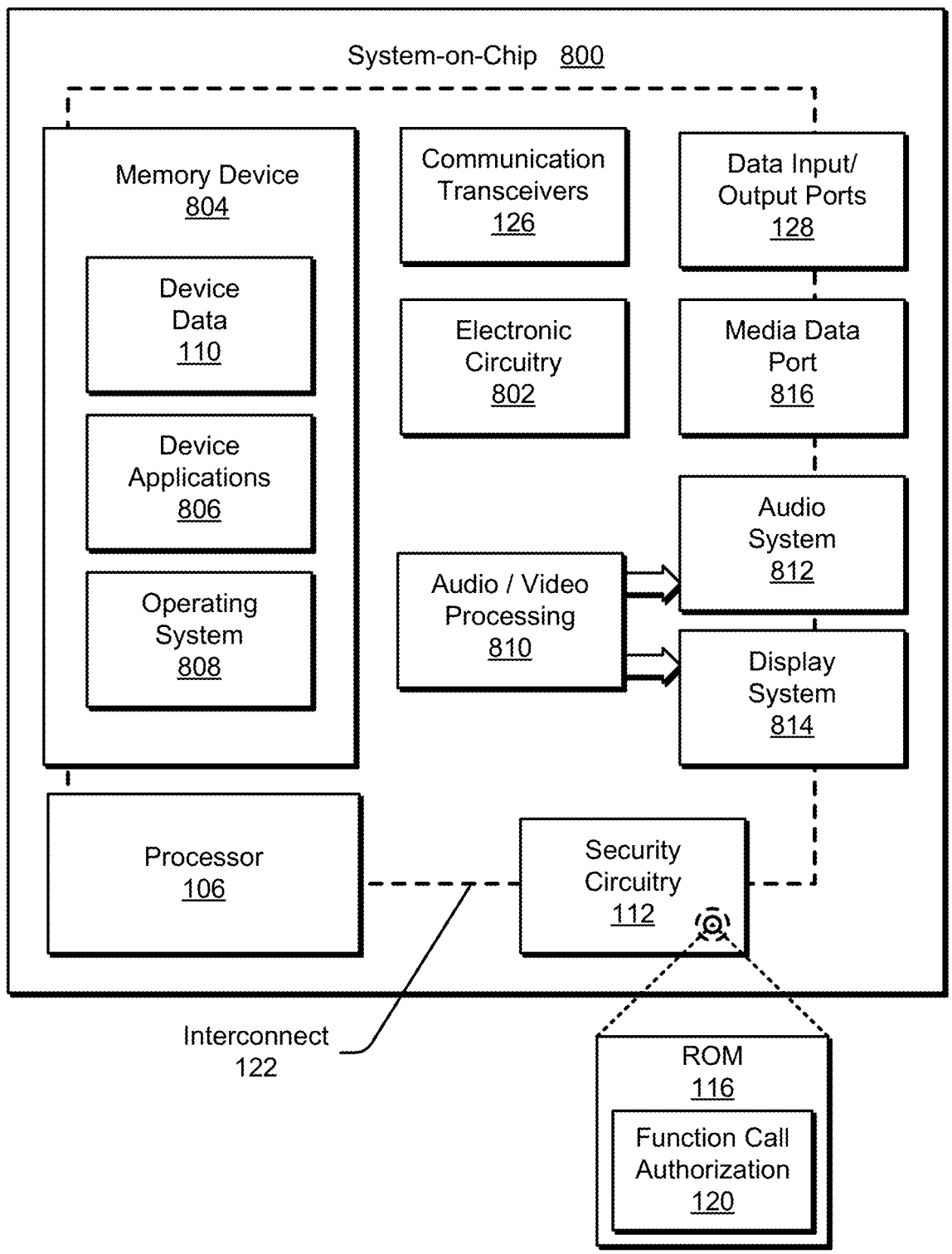
FIG. 8 illustrates an example System-on-Chip that may implement aspects of function call authorization for flow control.

FIG. 8 illustrates various components of an example System-on-Chip 800 (SoC 800) that can implement function call authorization in accordance with one or more aspects. The SoC 800 may be implemented as any single or multiple of a fixed, mobile, stand-alone, or embedded device; in any form of a consumer, computer, portable, user, server, communication, phone, navigation, gaming, audio, camera, messaging, media playback, and/or other type of SoC 800, such as the smartphone that is depicted in FIG. 1 as the apparatus 102. One or more of the illustrated components may be realized as discrete components or as integrated components on at least one integrated circuit of the SoC 800. Generally, the various components of the SoC 800 are coupled via an interconnect 122 and/or one or more fabrics that support communication between the components in accordance with one or more aspects of function call authorization.

The SoC 800 can include one or more communication transceivers 126 that enable wired and/or wireless communication of device data 110, such as received data, transmitted data, or other information identified above. Example communication transceivers 126 include near-field communication (NFC) transceivers, wireless personal area network (PAN) (WPAN) radios compliant with various IEEE 802.15 (Bluetooth™) standards, wireless local area network (LAN) (WLAN) radios compliant with any of the various IEEE 802.11 (WiFi™) standards, wireless wide area network (WAN) (WWAN) radios (e.g., those that are Third Generation Partnership Project compliant (3GPP-compliant)) for cellular telephony, wireless metropolitan area network (MAN) (WMAN) radios compliant with various IEEE 802.16 (WiMAX™) standards, infrared (IR) transceivers compliant with an Infrared Data Association (IrDA) protocol, and wired local area network (LAN) (WLAN) Ethernet transceivers.

The SoC 800 may also include one or more data input ports 128 via which any type of data, media content, and/or other inputs can be received, such as user-selectable inputs, messages, applications, music, television content, recorded video content, and any other type of audio, video, and/or image data received from any content and/or data source, including a sensor like a microphone or a camera. The data input ports 128 may include USB ports, coaxial cable ports, fiber optic ports for optical fiber interconnects or cabling, and other serial or parallel connectors (including internal connectors) for flash memory, DVDs, CDs, and the like. These data input ports 128 may be used to couple the SoC to components, peripherals, or accessories such as keyboards, microphones, cameras, or other sensors.

The SoC 800 of this example includes at least one processor 106 (e.g., any one or more of application processors, microprocessors, digital signal processors (DSPs), controllers, and the like), which can include a combined processor and memory system (e.g., implemented as part of an SoC), that processes (e.g., executes) computer-executable instructions to control operation of the device. The processor 106 may be implemented as an application processor, embedded controller, microcontroller, security processor, artificial intelligence (AI) accelerator, and the like. Generally, a processor or processing system may be implemented at least partially in hardware, which can include components of an integrated circuit or on chip system, a digital signal processor (DSP), an application-specific integrated circuit (ASIC), a field programmable gate array (FPGA), a complex programmable logic device (CPLD), and other implementations in silicon and/or other materials.

Alternatively or additionally, the SoC 800 can be implemented with any one or combination of electronic circuitry, which may include software, hardware, firmware, or fixed logic circuitry that is implemented in connection with processing and control circuits, which are generally indicated at 802 (as electronic circuitry 802). This electronic circuitry 802 can implement executable or hardware-based modules (not shown in FIG. 8), such as through processing/computer-executable instructions stored on computer-readable media, through logic circuitry and/or hardware (e.g., such as an FPGA), and so forth.

In aspects, the SoC 800 includes an interconnect 122, which may include any one or more of a system bus, interconnect, crossbar, data transfer system, or other switch fabric that couples the various components within the device to enable various aspects of signaling and/or communication with sparse encoding. A system bus or interconnect can include any one or a combination of different bus structures, such as a memory bus or memory controller, a peripheral bus, parity blocks, error correction code (ECC) blocks, a universal serial bus, and/or a processor or local bus that utilizes any of a variety of bus architectures.

The SoC 800 also includes one or more memory devices 804 that enable data storage, examples of which include random access memory (RAM), non-volatile memory (e.g., read-only memory (ROM), flash memory, erasable programmable read-only memory (EPROM), and electrically-erasable programable read-only memory (EEPROM)), and a disk storage device. Thus, the memory device(s) 804 can be distributed across different logical storage levels of a system as well as at different physical components. The memory device(s) 804 provide data storage mechanisms to store the device data 110, other types of code and/or data, and various device applications 806 (e.g., software applications or programs). For example, an operating system 808 can be maintained as software instructions within the memory device 804 and executed by the processor 106.

In some implementations, the SoC 800 also includes an audio and/or video processing system 810 that processes audio data and/or passes through the audio and video data to an audio system 812 and/or to a display system 814 (e.g., a video buffer or a screen of a smartphone or camera). The audio system 812 and/or the display system 814 may include any devices that process, display, and/or otherwise render audio, video, display, and/or image data. Display data and audio signals can be communicated to an audio component and/or to a display component via an RF (radio frequency) link, S video link, HDMI (high-definition multimedia interface), composite video link, component video link, DVI (digital video interface), analog audio connection, video bus, or other similar communication link, such as a media data port 816. In some implementations, the audio system 812 and/or the display system 814 are external or separate components of the SoC 800. Alternatively, the display system 814, for example, can be an integrated component of the example SoC 800, such as part of an integrated touch interface.

The SoC 800 of FIG. 8 may be an example implementation of the apparatus 102 of FIG. 1, an example implementation of a device or system that can implement function call authorization as described with reference to FIG. 1 through FIG. 8. The SoC 800 can thus include security circuitry 112, which can be a separate IC chip or included as part of another IC chip or device, like the processor 106, the electronic circuitry 802, or the memory device 804. Accordingly, one or more of the illustrated components may be integrated on the same IC chip, like an SoC, or at least on a single printed circuit board (PCB).

As shown, the security circuitry 112 may include an instance of the ROM 116 that stores source code (not shown) and a function call authorization module 120 (function call authorization 120), which may implement aspects of function call authorization as described with reference to FIGS. 1-7. Thus, the function call authorization block 120 of the SoC 800 may include code or instructions added to functions and programs, instructions for performing function call authorization checks, instructions for accessing registers configured to support function call authorization, or the like. The concepts of function call authorization for flow control as described herein can therefore be implemented by, or in conjunction with, the SoC 800 of FIG. 8.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description. Although implementations for a secure cryptographic processor have been described in language specific to certain features and/or methods, the subject of the appended claims is not necessarily limited to the specific features or methods described. Rather, the specific features and methods are disclosed as example implementations for secure cryptographic processing.

CONCLUSION

Although aspects of the described systems and methods for implementing function call authorization have been described in language specific to features and/or methods, the subject of the appended claims is, as recited by any of the previous examples not necessarily limited to the specific features or methods described. Rather, the specific features and methods are disclosed as example implementations of function call authorization, and other equivalent features and methods are intended to be within the scope of the appended claims. Further, various aspects of function call authorization are described, and it is to be appreciated that each described aspect can be implemented independently or in connection with one or more other described aspects.

What is claimed is:

1. A method comprising:
encountering a first instruction to call a function, the first instruction comprising a branch instruction or a jump instruction configured to call the function;
comparing an immediate value of a second instruction at an entry point of the function to a function call authorization value stored in a register, the second instruction comprising a landing pad instruction of the function, access to the register storing the function call authorization value limited to:
a first function call authorization instruction to set the function call authorization value;
a second function call authorization instruction to read the function call authorization value stored in the register; and
a third function call authorization instruction to clear the function call authorization value from the register; and
transferring control flow to the function in response to the immediate value of the second instruction matching the function call authorization value stored in the register.

2. The method as recited in claim 1, wherein function call authorization value comprises a function call authorization token stored in the register.

3. The method as recited in claim 2, wherein:
the register in which the function call authorization token comprises a register that is not part of the RISC a reduced instruction set computer (RISC) register file.

4. The method as recited in claim 1, wherein the function comprises a function that accesses sensitive information or operates on sensitive information.

5. The method as recited in claim 1, further comprising:
before encountering the first instruction to call the function, accessing the register to set the function call authorization value stored in the register.

6. The method as recited in claim 1, further comprising:
executing a first portion of code of the function;
comparing an immediate value of a third instruction at an intermediate point of the function to the function call authorization value stored in a register; and
executing a second portion of the code of the function in response to the immediate value of the third instruction matching the function call authorization value stored in the register; or
ceasing execution of the function in response to the immediate value of the third instruction not matching the function call authorization value stored in the register.

7. The method as recited in claim 1, further comprising:
obtaining a return address from the function from a call stack; and
returning from the function to the return address obtained from the call stack.

8. The method as recited in claim 1, further comprising:
prior to returning from the function, clearing the function call authorization value stored in the register.

9. The method as recited in claim 1, further comprising:
prior to executing code that includes the first instruction and the second instruction:
determining the immediate value for the second instruction, the immediate value associated with the function to enable function call authorization; and
adding, to code of the function, code of the second instruction that includes the immediate value.

10. An integrated circuit comprising:
a register configured to store a function call authorization value, access to the register limited to a first function call authorization instruction to set the function call authorization value, a second function call authorization instruction to read the function call authorization value stored in the register, and a third function call authorization instruction to clear the function call authorization value from the register; and
a processor configured to execute instructions to implement a function call authorization code module, the function call authorization code module configured to:
encounter a first instruction to call a function, the first instruction comprising a branch instruction or a jump instruction configured to call the function;
compare an immediate value of a second instruction at an entry point of the function to the function call authorization value stored in the register, the second instruction comprising a landing pad instruction of the function; and transfer control flow to the function in response to the immediate value of the second instruction matching the function call authorization value stored in the register.

11. The integrated circuit as recited in claim 10, wherein function call authorization value comprises a function call authorization token stored in the register.

12. The integrated circuit as recited in claim 11, wherein: the register in which the function call authorization token comprises a register that is not part of a reduced instruction set computer (RISC) register file.

13. The integrated circuit as recited in claim 10, wherein the function comprises a function that accesses sensitive information or operates on sensitive information.

14. The integrated circuit as recited in claim 10, wherein the function call authorization code module is further configured to:

before encountering the first instruction to call the function, access the register to set the function call authorization value.

15. An integrated circuit comprising:

a register configured to store a function call authorization token;

a hardware-based call stack; and a processor configured to execute instructions to implement a function call authorization module, the function call authorization module configured to:

access the register to set the function call authorization token, access to the register limited to a first function call authorization instruction to set the function call authorization token, a second function call authorization instruction to read the function call authorization token stored in the register, and a third function call authorization instruction to clear the function call authorization token from the register;

encounter an instruction to call a function, the instruction comprising a branch instruction or a jump instruction configured to call the function;

compare an immediate value of a landing pad instruction at an entry point of the function to the function call authorization token stored in the register;

transfer control flow to the function in response to the immediate value of the landing pad instruction matching the function call authorization token stored in the register;

obtain a return address from the function from the hardware-based call stack; and return from the function to the return address obtained from the hardware-based call stack.

16. The integrated circuit as recited in claim 15, wherein the landing pad instruction comprises an only entry point of the function and the processor is further configured to raise a fault responsive to an attempt to enter the function at any other point.

17. The integrated circuit as recited in claim 15, wherein the function call authorization module is further configured to:

prior to returning from the function, clearing the function call authorization token stored in the register.

18. The integrated circuit as recited in claim 15, further comprising a memory storing code of the function and multiple other functions and wherein the function and multiple other functions are each configured to use different respective function call authorization tokens.

19. The integrated circuit as recited in claim 15, the register configured to store a function call authorization token comprises a limited-access register that is not part of a reduced instruction set computer (RISC) register file.

20. The integrated circuit as recited in claim 16, wherein the function comprises a function that accesses sensitive information or operates on sensitive information.

* * * * *